United States Patent [19]

Leiber et al.

[11] 4,312,380
[45] Jan. 26, 1982

[54] MAGNETIC VALVE

[75] Inventors: Heinz Leiber, Leimen; Günter Piesche, Ubstadt-Weiher, both of Fed. Rep. of Germany

[73] Assignee: Robert Bosch GmbH, Stuttgart, Fed. Rep. of Germany

[21] Appl. No.: 118,015

[22] Filed: Feb. 4, 1980

[30] Foreign Application Priority Data

Mar. 10, 1979 [DE] Fed. Rep. of Germany ....... 2909504

[51] Int. Cl.³ .............................................. F16K 31/06
[52] U.S. Cl. .................. 137/627.5; 137/596.17; 137/625.65; 251/129; 251/330
[58] Field of Search ............... 137/596.17, 625.65, 137/627.5; 251/129, 330

[56] References Cited

U.S. PATENT DOCUMENTS

| | | | |
|---|---|---|---|
| 3,329,165 | 7/1967 | Lang | 137/625.65 X |
| 3,921,666 | 11/1975 | Leiber | 137/627.5 X |
| 3,970,111 | 7/1976 | Brüne et al. | 137/627.5 |
| 3,989,063 | 11/1976 | Brouwers et al. | 137/627.5 X |
| 4,040,445 | 8/1977 | McCormick | 137/625.65 X |

FOREIGN PATENT DOCUMENTS

| | | | |
|---|---|---|---|
| 1930447 | 1/1970 | Fed. Rep. of Germany | 137/625.65 |
| 1302616 | 7/1962 | France | 137/625.65 |

*Primary Examiner*—Gerald A. Michalsky
*Attorney, Agent, or Firm*—Edwin E. Greigg

[57] ABSTRACT

The invention relates to a magnetic valve in which the electromagnet is housed in a chamber which is not infiltrated by the pressure medium to be controlled, and in which a rod coupling is effective between the armature of the electromagnet and the closure body of the valve inserted between a pressure source and a pressure consumer, and in which a sealing apparatus is provided which seals the entryway of the rod coupling into the region infiltrated by pressure medium. Furthermore, the consumer through the operation of a slider valve is connectable firstly to a low-pressure chamber, secondly to a position to break flow and thirdly to a high-pressure chamber. In addition, the slider valve is controllable into two different energized positions through the use of plural spring elements and the electromagnet can be subjected to varying electrical output to attain an intermediate or final position.

5 Claims, 3 Drawing Figures

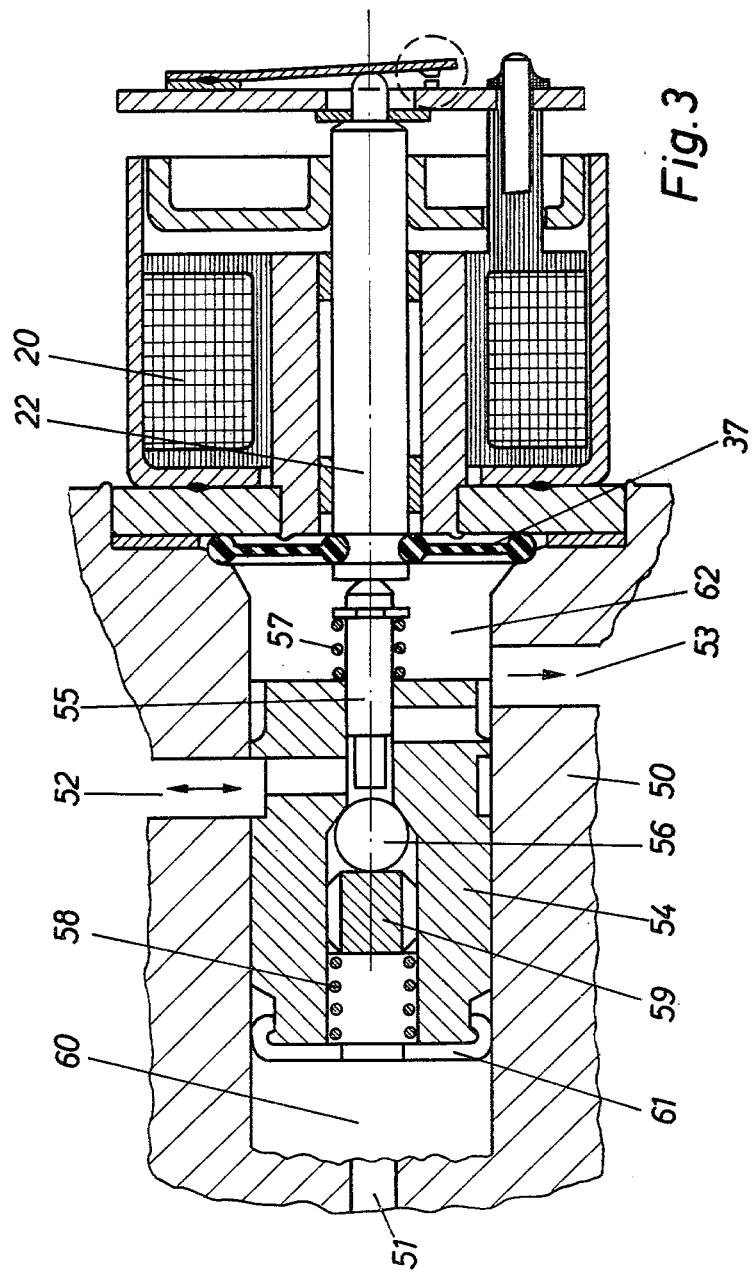

MAGNETIC VALVE

BACKGROUND OF THE INVENTION

The invention relates to a magnetic valve in which the electromagnet is housed outside the chamber having pressure medium passing through it, wherein a push rod connection is provided between the armature of the electromagnet and the closing body of a valve so it can be switched between a pressure source and a consumer, and more particularly wherein this push rod connection is guided through an aperture in a wall between a high-pressure chamber connectable with the source of relatively high pressure and an intermediate pressure chamber located between the high-pressure chamber and the electromagnet and which communicates with a chamber exposed to a relatively low pressure. In such a device the guide aperture is so dimensioned that on the one hand a flow of pressure medium is brought about from the high-pressure chamber to the low-pressure chamber along the push rod connection, but on the other hand the pressure drop at the aperture between the high-pressure chamber and the intermediate-pressure chamber comprises by far the greatest portion of the pressure difference between the high-pressure chamber and the low-pressure chamber and wherein the insertion of the push rod connection into the intermediate-pressure chamber from the electromagnet is sealed off by a diaphragm secured on the push rod and the valve housing.

A valve of this kind is the subject of an earlier patent application, Ser. No. 39,033 filed May 14, 1979, the entire disclosure of which is incorporated herein by reference, in the name of Heinz Leiber and assigned to the assignee of the present invention. In the subject of the earlier case, the additional characteristic is used in accordance with which a closing element to be actuated by the push rod connection interrupts, in one valve position, a flow of pressure medium from the source of relatively high pressure to the intermediate-pressure chamber.

The use of a dry magnetic circuit has the advantage that the engineer has greater freedom as to its form, method of manufacture, and the material comprising it; the magnetic circuit needs not be tightly welded or soldered. Also, in a dry magnetic circuit, valve movements are more easily ascertained by associated measuring transducers to the moving elements, which, however, can be useful in testing valve function. Furthermore, the dead time of the valve, for instance from the application of the voltage up to the movement of the armature, can be evaluated electronically and utilized for closed-loop control procedures. With this structure having separate elements, the chamber of the area through which pressure medium passes can be very much smaller; smaller pressure chambers, however, also mean that the pressure forces which must be withstood by the valve housing are smaller.

On the one hand, the usage of the invention requires a source of relatively high pressure, with the valve intended to direct the flow of pressure medium to a consumer; on the other hand, however, it also requires a low pressure chamber. Such conditions are present, for instance, in anti-locking control systems in motor vehicles, where on the one hand there is a source of brake pressure and on the other hand, the withdrawal of brake fluid, by means of valves, out of the wheel brake cylinders into a reservoir of relatively low pressure is also necessary. If, the brake pressure source is a pump having a subsequent brake control valve (full-power), then the low-pressure chamber is the brake fluid reservoir with zero pressure, while if a main brake cylinder is used as the pressure source, the withdrawn pressure fluid is withdrawn into a reservoir chamber which is at low pressure and whose contents must be reintroduced into the main pressure circuit. Other systems with similar conditions are also conceivable.

The arrangement in accordance with the invention is also applicable when gas is used as the pressure medium; however, it is primarily intended for use in hydraulic systems.

OBJECT AND SUMMARY OF THE INVENTION

The fundamental object of the invention is, using the principles of the earlier patent, to create 3/3-way valves—that is, valves having three connections and three valve positions. Such valves enable a pressure buildup, pressure drop and pressure maintenance at a constant level at the consumer.

This object is attained in that the valve has a further connection, via which the consumer can be connected to a low-pressure chamber and also that the push rod connection is effective as the movable part of a slide valve (slider) or displaces a slider of this kind, which in a first position connects the consumer with the low-pressure chamber, in a second position breaks this connection, and in a third position connects the high-pressure chamber to the consumer; and that the valve is thereby controllable into its two energized states. Further it is revealed that from the outset position up to the attainment of an intermediate position a restoring spring force acts on the slider, while from the attainment of the intermediate position until the attainment of the final position a greater restoring spring force acts on the slider; and that the electromagnet is exposed to varying electrical output for attainment of the intermediate or the final position.

As such, 3/3-way valves are known (German Offenlegungsschrift No. 22 57 213). The invention consists in transferring the principles of the earlier patent onto these 3/3-way valves.

There are two possibilities for embodiment of the 3/3-way valves in accordance with the invention. In one possibility, no seat valves are provided and all functions are taken over by the slider performing its characteristic role. In the other version, the slider is used as a slide for only some of the functions; in addition, there is also a seat valve which can be pushed open by the slider. This latter possibility has the advantage that—as in the earlier patent—in one valve position, especially when the valve is in the resting state, the path between the high-pressure chamber and the intermediate-pressure chamber is interrupted by the closing valve and thus a leakage flow does not arise between these chambers.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 shows one form of embodiment of the invention having one slider and one seat valve.

DESCRIPTION OF THE PREFERRED EMBODIMENTS

Figure 1:
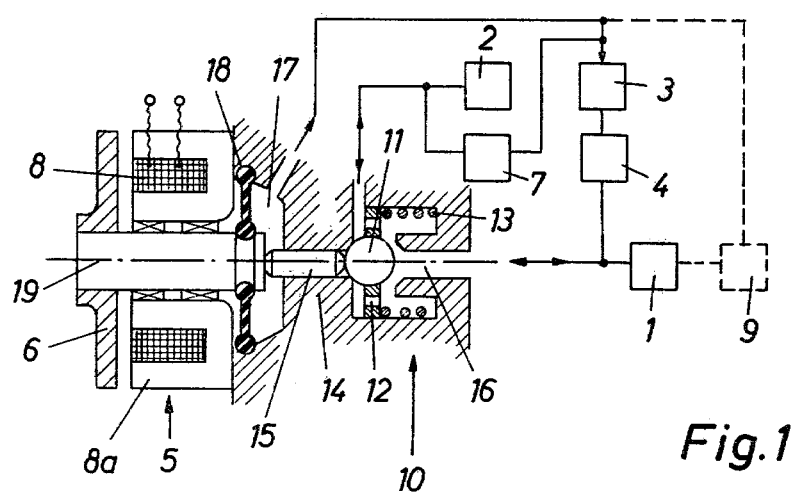
FIG. 1 is a schematic view of FIG. 1 of an earlier application Ser. No. 39,033, filed May 14, 1979 by Heinz Leiber one of the co-inventors herein.

In FIG. 1 are shown a pressure source, for instance, a main brake cylinder 1; a consumer, for instance, a wheel brake cylinder 2; and a low-pressure chamber, for instance, a reservoir chamber 3. The magnetic valve 5/10 in accordance with the invention is switched into the line between the main brake cylinder 1 and the wheel brake cylinder 2; here, the magnetic valve is used as an inlet valve, and in its energized state it blocks the line from the main brake cylinder 1 to the wheel brake cylinder 2. Then, brake fluid can be withdrawn by means of the outlet valve 7 out of the section of line between the valve 10 and the wheel brake cylinder 2 into the reservoir chamber 3. The withdrawn pressure medium is then reintroduced into the main circuit by means of the re-supply apparatus 4, such as a pump.

The magnetic valve 5/10 comprises the valve portion 10 with the closing element 11 embodied as a ball, together with the ball holder 12 and the spring 13 which holds the closing element in the illustrated position, and the electromagnet 5, made up of the armature 6, the raised parts 8a, the coil 8 and the push rod 19. The electromagnet 5 is disposed outside the pressure chambers of the valve. The valve 10 is actuated by the reciprocal motion of the armature 6 which in turn operates the push rod 19 and upon such reciprocal movement of the push rod 19, which abuts the auxiliary push rod, this last-named rod is slid through means defining an opening in the wall 14 and caused to move the closing element 11 against the spring 13. The means defining the opening for the auxiliary push rod 15 is dimensioned such that a leakage flow is possible along the push rod 15 from the high-pressure chamber 16 to the intermediate-pressure chamber 17. The intermediate-pressure chamber is sealed off from the outside by means of a diaphragm 18 which is secured on the valve housing and the rod 19 which extends therethrough.

Upon braking, a high pressure is present in the pressure chamber 16 and at the brakes; however, because the closing body 11 seals off the aperture through the wall 14 for the auxiliary push rod 15, there is no resultant leakage flow along the push rod. Only when brake pressure control is performed and the valve 10 has thus (relatively briefly) switched over, does a leakage flow arise along the auxiliary push rod 15 into the intermediate-pressure chamber 17 and from there on to the reservoir chamber 3 which acts as the low-pressure chamber as a result of the higher pressure in the high-pressure chamber 16. The pressure difference between the intermediate-pressure chamber and the low-pressure chamber is small. Because of the inventive embodiment, the sealing problem for the passageway of the push rods 15 and 19 is entirely unimportant. On the one hand, there are no difficulties associated with the necessity for sealing the passageway of the auxiliary push rod 15, because, of course, a leakage flow is permitted; and on the other hand, the embodiment of the diaphragm 18 is entirely unproblematic because it is exposed to only small pressure differences.

In FIG. 1, it is also indicated by broken lines that—in the case of the embodiment of the brake pressure source 1 as a pump having a subsequent brake pressure control valve—the brake fluid coming from the valve 7 and out of the chamber 17 can pour into a supply container. In that case, the low-pressure chamber then has a zero overpressure. In such an embodiment, the reservoir chamber 3 and the resupply apparatus 4 are omitted.

Figure 2:
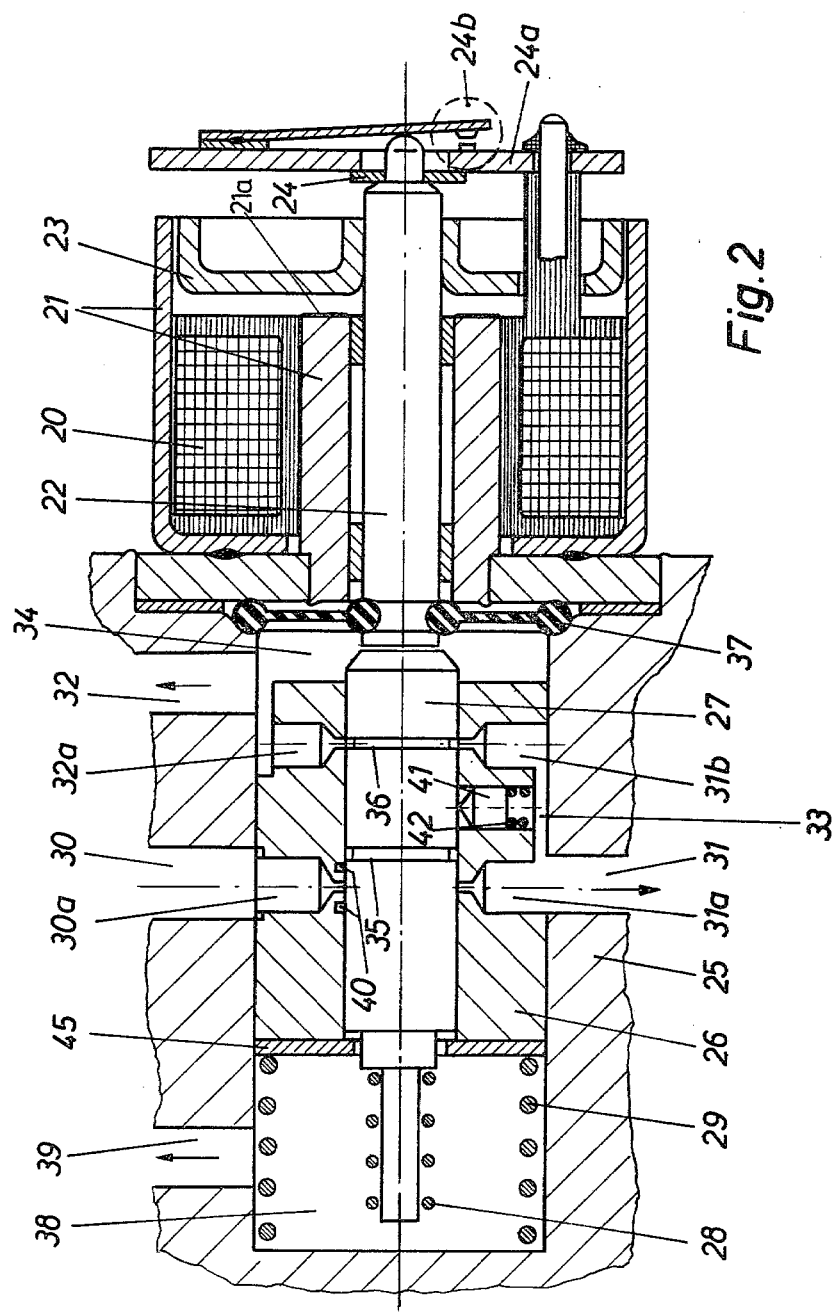
FIG. 2 shows a cross-sectional view of an embodiment of the invention having only one slider.

In FIG. 2, as viewed in the drawing, the valve is shown on the left and the associated electromagnet is shown next to it on the right. These elements are sealed off with respect to one another.

The electromagnet comprises the coil 20, the soft iron yokes 21 and the movable armature, which is made up of the push rod 22 and the sheet-metal pole 23. In the unenergized state, the armature is in contact via the sheet-metal stop 24, with the stop plate 24a.

The valve element comprises the valve housing 25, an element 26 disposed therein in fixed fashion, and a push rod 27 movable therein which is embodied as a slider. The spring 28 normally holds the slider 27 and the armature 22/23 in the illustrated position. A second spring 29 presses the sheet-metal stop 45 against the element 26. Three connections are provided in the valve body 25; the pressure source is connected to connection 30, the consumer to connection 31 and the low-pressure chamber to connection 32. These connections 30-32 are continued in tapering channels 30a, 31a and 31b—these three being interconnected by the groove 33 and 32a—, while the connection 32 communicates in addition with the intermediate-pressure chamber 34. The slider 27 has two connecting channels 35 and 36. The intermediate-pressure chamber is sealed off with respect to the electromagnet by means of the diaphragm 37 connected to the housing 25 and the push rod 22.

In the illustrated position, the connection 31 connected to the consumer communicates via the groove 33, the channels 31b, 36 and 32a with connection 32 and thus with the low-pressure source and is accordingly pressure-relieved.

If an electrical current $i_1$ which overcomes the force of the spring 28 including friction is sent through the coil 20, then the slider 27 is moved toward the left until it contacts the sheet-metal stop 45. In this position, the communication between connections 31 and 32 is interrupted, however, communication is not yet established between connections 30 and 31; that is, the pressure ratios are maintained. If an electrical current $i_2$, which can additionally overcome the force of spring 29, is fed into the coil, then the slider 27 including the sheet-metal stop 45 moves farther toward the left, until the sheet-metal pole 23 makes contact with element 21a. Now the pressure source connected at 30 communicates with the consumer connected at 31, via the channel 35.

As has already been noted, the surface area between the slider 27 and the element 26 is selected or correlated to be such that a leakage flow is permitted along the gap which remains, to thereby permit flow to the intermediate-pressure chamber 38, which communicates via connection 39 with the low-pressure chamber as well. The gap which is allowed between elements 26 and 27 is selected to be such, however, that the pressure drop along this gap is greater than that in the channel leading to the low-pressure chamber. Thus, there is only a low pressure in the chamber 34; the diaphragm 37 is thus sufficient for sealing purposes. Annular channels 40 cut into element 26 surrounding the tapering channel 30a communicates (not shown) with the low-pressure chamber; as a result, the leakage flow to the chambers 34 and 38 is lessened. In order to counter the radial deflection of the slider 27 with the pressure in the channel 30a, a plunger 41 is provided with a back-up spring 42, which together with the pressure in the groove 33 exert a counter-force upon the slider 27.

The push rod 22 is also used in FIG. 2 for the purpose of actuating an electrical diagnosis switch 24b, which is placed on the stop plate 24a, in accordance with the position desired.

When viewing the drawing in FIG. 3, the elements shown on the right of the diaphragm are identical to those shown in FIG. 2. The valve housing 50 again has three connections 51–53, of which connection 51 is intended to communicate with the pressure source, connection 52 with the consumer and connection 53 with the low-pressure source. The element 54 is disposed in fixed fashion in the valve housing 50, and the push rod 55 is slidably supported therein. The push rod 55 serves in part as a slider and in part as a push rod for lifting the closing element 56 from its valve seat. The spring 57 urges the push rods 55 and 22 into the illustrated normal position. The spring 58, via the element 59 provided with longitudinal grooves, causes the closing element 56 to be pressed against its seat formed by the widening of the channel, and thus blocks off the high-pressure source or chamber 60 from the other connections. The element 61 serves the purpose of holding the spring 58.

In the illustrated position of push rods 55 and 22, the consumer (at 52) communicates with the low-pressure chamber (at 53). If the coil 20 is supplied with sufficient electrical current, then the push rods 22 and 55 move toward the left, until the push rod 55 contacts the closing body 56. Connections 52 and 53 are now no longer connected to one another. With an increase in electrical current such that not only the forces of the springs 57 and 58 but also the force exerted on the closing element 56 are overcome, the push rod 55 pushes the seat valve (56) up and connects the pressure source with the consumer. Only in this position is the high pressure of the pressure source present at the push rod 55, causing a corresponding leakage flow to the intermediate-pressure chamber 62, whereupon the pressure in this chamber remains at a low level, for the reasons already given. Because the valve arrangement most often assumes the illustrated position, a leakage flow thus occurs only in exceptional cases, that is, during the valve actuation.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A magnetic valve including a housing and an electromagnet having an armature and housed in a chamber in said housing which is not infiltrated by the pressure medium to be controlled, a valve closure body inserted between a pressure source and a pressure consumer, a rod coupling disposed between the armature of the electromagnet and the closure body of the valve, a membrane secured to said rod coupling and to said valve housing, a sealing apparatus for sealing the entryway of the rod coupling into the region infiltrated by pressure medium, a high-pressure chamber arranged to be connected with a source of relatively high pressure and an intermediate-pressure chamber located between said high-pressure chamber and said electromagnet, a low-pressure chamber subjected to relatively low pressure, said intermediate-pressure chamber communicating with said low-pressure chamber, a wall having a passageway opening between said high pressure chamber and said intermediate-pressure chamber, said rod coupling passing through said passageway opening, said passageway opening being so dimensioned that, first, on the one hand, a flow of pressure medium arises from said high-pressure chamber to said low-pressure chamber along the rod coupling while on the other hand, the pressure drop at said passageway opening between said high-pressure chamber and said intermediate pressure chamber constitutes by far the greatest share of the pressure difference between said high-pressure chamber and said low-pressure chamber, characterized in that said valve has a further connection, through which said consumer is connectable with said low-pressure chamber, that the rod coupling is effective to displace a slider valve, which in one position connects said consumer with said low-pressure chamber, in a second position breaks this connection, and in a third position connects the high-pressure chamber to said consumer, and that the valve is controllable as a result into two different energized positions, that from the outset position up to the attainment of an intermediate position one restoring spring force is exerted upon said slider valve and from the attainment of the intermediate position up to the attainment of the final position a greater restoring spring force is exerted upon said slider valve and that the electromagnet can be subjected to varying electrical output in order to attain position control.

2. A magnetic valve in accordance with claim 1, characterized in that said slider valve is subjected to said restoring spring, and further that a stop subjected to said spring force is provided with which the slider makes contact upon the attainment of an intermediate position and that a further stop is provided which prevents further movement upon the attainment of said final position.

3. A magnetic valve in accordance with claim 1, characterized in that a channel communicating with said chamber of low pressure is cut into the interior of a sleeve which surrounds the slider valve, thereby straddling the connection to the high pressure chamber.

4. A magnetic valve in accordance with claim 1, characterized in that said sleeve surrounding said slider valve further includes spring-loaded means to restrict movement of said slider valve.

5. A magnetic valve in accordance with claim 1, characterized in that said slider valve, in the outset position, connects two radial openings, which communicate with the low-pressure chamber and with said consumer, respectively, that in the intermediate position said slider valve breaks this connection and that in the final position said valve lifts up from its valve seat an axially movable closing element, which is axially prestressed by spring means against the displacement of said slider valve, so that a seat valve when in a closed state blocks off the high-pressure chamber from the pressure source.

* * * * *